US006295189B1

(12) United States Patent
Perelle et al.

(10) Patent No.: US 6,295,189 B1
(45) Date of Patent: Sep. 25, 2001

(54) PROTECTION FOR BATTERY MODULE WITH DIODE MEMORY

(75) Inventors: Michel Perelle, Melsa; Jean-Pierre Planchat, Saint Benoit; Gérard Rigobert, Poitiers; Laurent Souliac, Saint Benoit, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/476,371

(22) Filed: Jan. 3, 2000

(30) Foreign Application Priority Data

Jan. 7, 1999 (FR) .................................................. 99 00088

(51) Int. Cl.$^7$ ...................................................... H02H 3/00
(52) U.S. Cl. .................................. 361/55; 361/78; 361/86; 361/91.5; 361/104
(58) Field of Search ................................... 361/54, 55, 56, 361/57, 78, 86, 91.1, 91.3, 91.5, 91.6, 104; 320/134, 136

(56) References Cited

U.S. PATENT DOCUMENTS 4,975,798 * 12/1990 Edwards et al. ....................... 361/56

5,625,273   4/1997 Fehling et al. ....................... 320/136

FOREIGN PATENT DOCUMENTS 0 372 832    6/1990 (EP) .

* cited by examiner

*Primary Examiner*—Michael J. Sherry
(74) *Attorney, Agent, or Firm*—Sughrue, Mion, Zinn, Macpeak & Seas, PLLC

(57) ABSTRACT

A battery module including at least one cell, at least one sensor, an interrupter device such as a fuse connected in series with the cells and an electronic switch. The electronic switch includes power transistors for short circuiting the series-connected components and the fuse if the sensor senses a malfunction and a diode for assuring that the power transistors maintain the series-connected circuit short circuited regardless of the subsequent status of the sensor. The diode memorizes the malfunction so that the module continues to conduct after the fuse blows, even if the sensors no longer detect any malfunction.

14 Claims, 2 Drawing Sheets

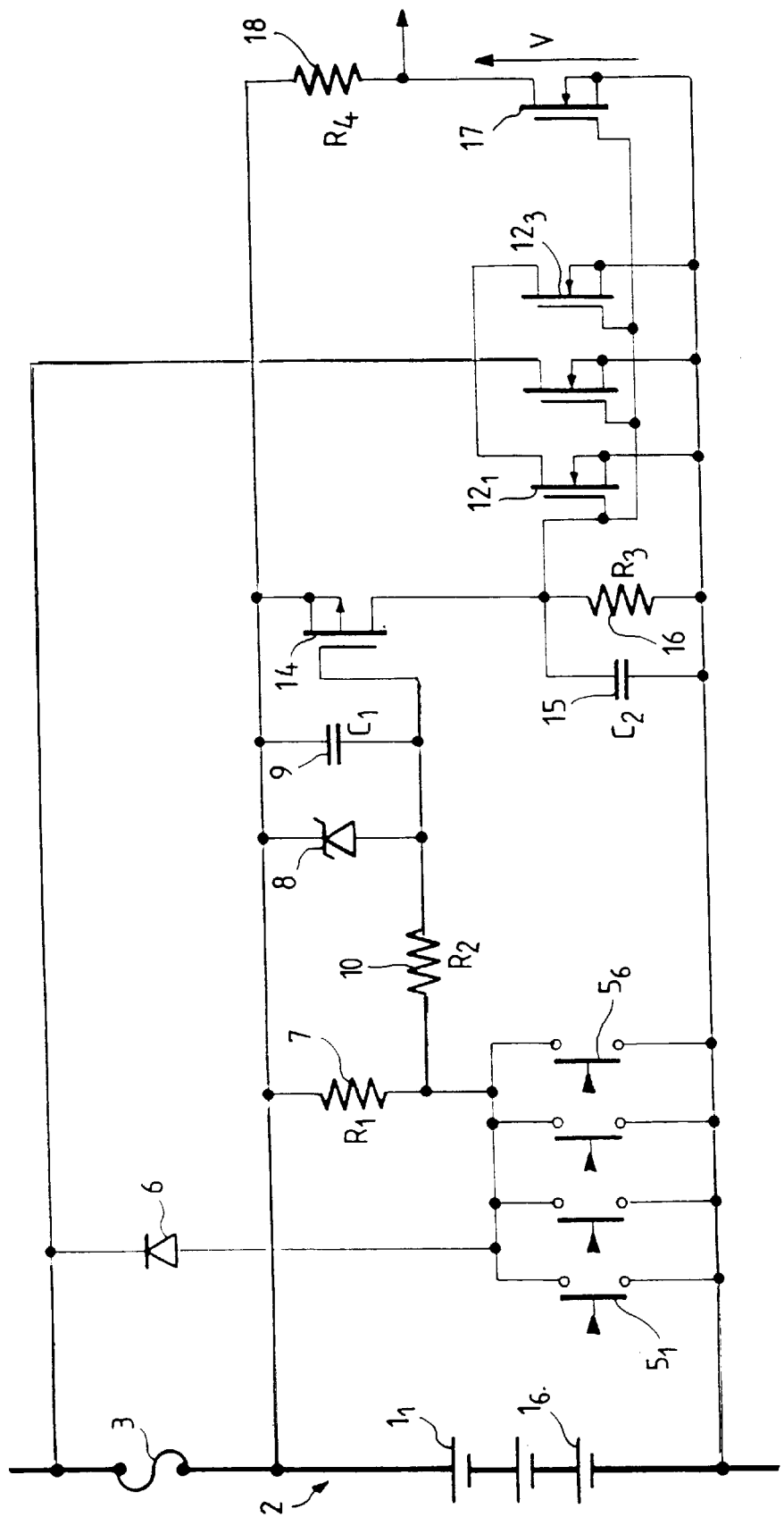
FIG_1

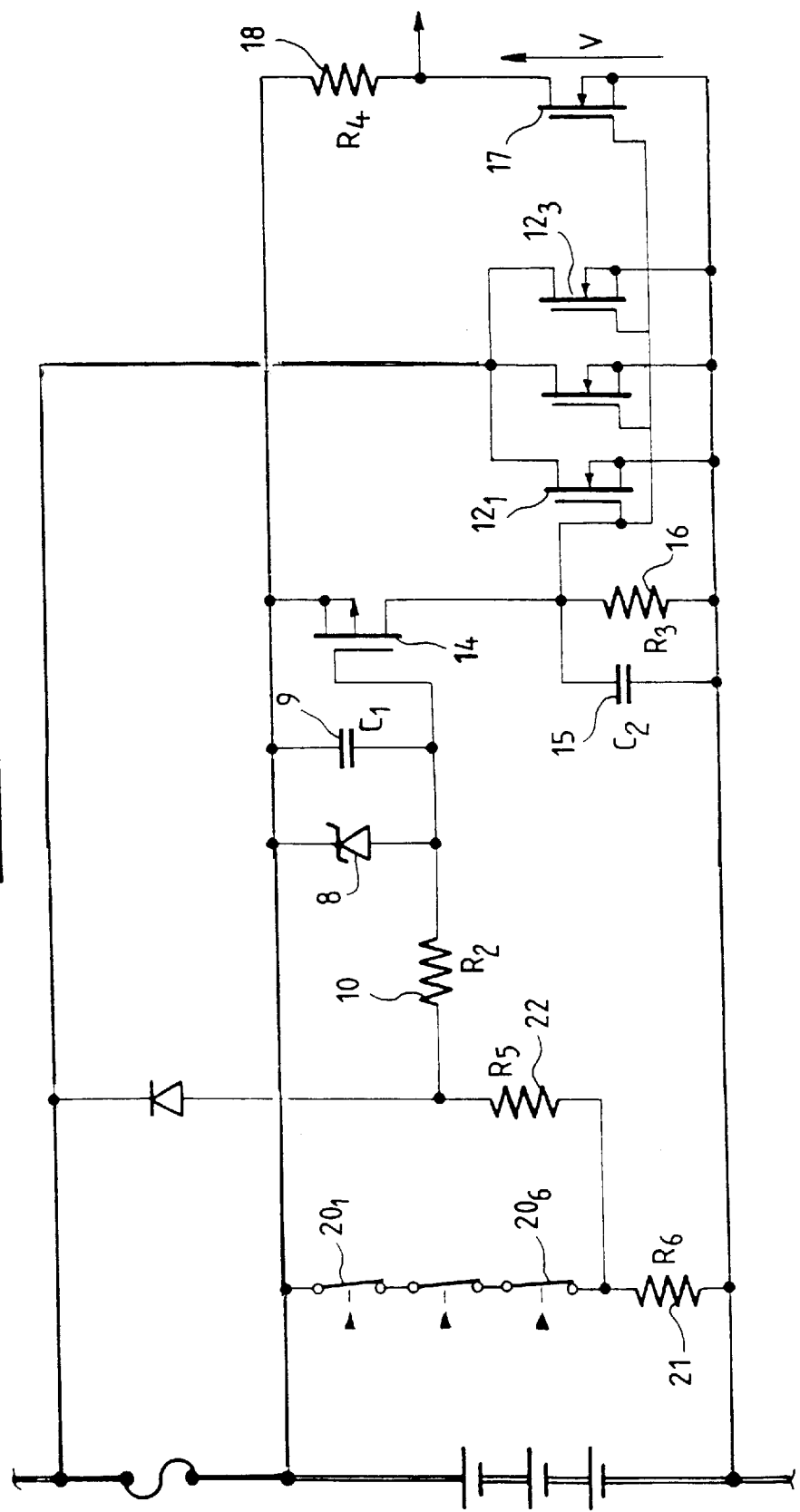
FIG_2

PROTECTION FOR BATTERY MODULE WITH DIODE MEMORY

The present invention relates to a battery module including at least one cell and at least one sensor responsive to malfunctions of one or more cells.

The invention relates to the protection of battery cells against malfunctions, such as pressure rises in sealed cells, overheating, overvoltages, undervoltages, short circuits, etc.

BACKGROUND OF THE INVENTION

French Patent Application No. 98 05541 filed Apr. 30, 1998 describes a battery module including cells with at least one sensor, a fuse connected in series with the cells and an electronic switch controlled by the sensor and which closes the series-connected circuit made up of the cells and the fuse. The above application mentions transistors, thyristors, IGBT and MOS as examples of electronic switches.

OBJECTS AND SUMMARY OF THE INVENTION

The invention proposes an electronic switch of the above kind. It thereby provides a solution to the problem of protecting a battery module using an interrupter device disposed in or on the module and in particular proposes a solution to the problem of protecting the module without increasing its internal resistance.

The invention provides a simple and effective way to assure the memory function described in the French application referred to above. It thereby enables the module to remain conductive even after the cells have been isolated.

To be more precise, the present invention proposes a battery module including at least one cell, at least one sensor, an interrupter device connected in series with the cells and an electronic switch including:

at least one power transistor short circuiting the series-connected components and the interrupter device if the sensor senses a malfunction, and a diode for assuring that the power transistors maintain the series-connected circuit short circuited regardless of the subsequent status of the sensor.

In an embodiment of the invention, the electronic switch further includes a control transistor for turning on the power transistor if the sensor senses a malfunction and the diode is adapted to apply the voltage of the cells to the gate of the control transistor if the power transistors are turned on.

The diode is advantageously connected to the gate of the control transistor and to the terminal of the module on the same side as the interrupter device.

In this case, the diode is preferably connected to the gate of the control transistor via a resistor.

In another embodiment of the invention the module includes a capacitor for delaying application of a voltage to the gate of the control transistor.

The module advantageously includes a zener diode for limiting the voltage applied to the gate of the control transistor.

In an embodiment of the invention the sensors include a pressure-sensitive switch. There can be a pressure-sensitive switch connected to the terminals of each cell.

In an embodiment of the invention the sensors include an overvoltage sensor. There can be an overvoltage sensor connected to the terminals of each cell.

In an embodiment of the invention the sensors control switches which are connected in parallel and are open when the cells are operating normally, the series-connected combination of a resistor and the switches shunts the terminals of the cells, and the gate of the control transistor is connected between said resistor and said sensors.

In another embodiment of the invention the sensors control switches which are connected in series with a resistor and are closed when the cells are operating normally, the switches and the resistor shunt the terminals of the cells, and the gate of the control transistor is connected between said resistor and said sensors.

The invention also provides a method of protecting against malfunctions of a battery module including at least one cell connected in series with an interrupter device, at least one sensor and at least one power transistor controlled by said sensor, in which method, if the sensor detects a malfunction, it operates the power transistor which closes the series-connected circuit made up of the cells and the interrupter device, and the diode keeps the transistor in the state closing the series-connected circuit regardless of the subsequent status of the sensor.

The sensor preferably operates the transistor if the malfunction continues after a time-delay.

BRIEF DESCRIPTION OF THE DRAWINGS

Other features and advantages of the invention will become apparent on reading the following description of embodiments of the invention which is given by way of example only and with reference to the accompanying drawings, in which:

FIG. 1 is a diagram showing a first embodiment of a module in accordance with the invention, and FIG. 2 is a diagram showing a second embodiment of a module in accordance with the invention.

MORE DETAILED DESCRIPTION

FIG. 1 is a diagram showing a module in accordance with the invention. A module of this kind is intended to be connected to a power line in series with other modules to form a battery. The invention proposes protection against malfunctions in the cells of the module. In this embodiment of the invention, and in that shown in FIG. 2, the cells are protected by isolating them in the event of a malfunction; however, the module remains electrically conductive before, while and after the safety system operates.

The module shown in FIG. 1 is made up of a plurality of cells (six cells $1_1$ to $1_6$ in this figure) in three groups in series which are connected to a power line 2, each group including two cells in parallel. A fuse 3 is connected to the power line 2 in series with the cells. At least one cell can include a pressure-sensitive switch formed by a pressure sensor, not shown, controlling a switch; in the embodiment shown in FIG. 1 each cell has a pressure-sensitive switch; the switches $5_1$ to $5_6$ of the pressure-sensitive switches are connected in parallel and are normally open when the pressure in the cells is below a safe pressure. Each switch $5_1$ to $5_6$ closes if the pressure in the corresponding cell rises above the safe pressure.

The parallel-connected switches are connected in series with a diode 6; the combination of the diode and the switches shunts the series connection terminals of the cells and the fuse. The cathode of the diode is at the same end as the fuse in this figure and the fuse is at the positive end of the module.

The circuit shown in FIG. 1 further includes a resistor $R_1$ 7 connected like the diode 6 to the parallel connection terminals of the switches and to the power line 2 between the cells and the fuse.

A zener diode 8 shunting a capacitor $C_1$ 9 is connected in series with a resistor $R_2$ 10. The anode of the diode is connected to the gate of the control transistor, which is a P-type MOS transistor in this figure.

A set of parallel-connected power transistors $12_1$ to $12_n$, where n=3 in the figure, shunts the series connection terminals of the cells and the fuse. A plurality of transistors is used in the embodiment shown in the figure; there could instead be only one transistor. The embodiment of the invention shown in the figure uses N-type MOS transistors, which have a low series resistance.

The terminals of the cells are connected in parallel with a series-connected circuit including a control transistor 14 and a capacitor $C_2$ 15 shunting a resistor $R_3$ 16. The transistor is a P-type MOS transistor, for example.

The gate of the control transistor 14 is connected to the resistor $R_2$ 10 and to the zener diode 8. The gates of the power transistors $12_1$ to $12_n$ are connected between the transistor 14 and the shunt circuit $R_3C_2$.

The circuit includes a shunt providing information for electronically monitoring the modules; this shunt includes an information transistor 17 in series with a resistor $R_4$ 18; the series-connected combination shunts the terminals of the cells. The gate of the power transistors and the gate of the information transistor are connected between the transistor 14 and the shunt circuit $R_3C_2$. The difference V between the potential at the negative terminal of the cells and the potential at the point between the information transistor 17 and the resistor $R_4$ is representative of the voltage at the terminals of the module.

The various circuit components can have the following values:

$R_1$ =10 k$\Omega$
$R_2$ =1 M$\Omega$
$C_1$ =0.1 $\mu$F
$R_3$ =100 k$\Omega$
C2=10 nF
$R_4$ =100 k$\Omega$ The circuit shown in FIG. 1 operates in the following manner. When the cells are operating normally, the switches $5_1$ to $5_6$ are open and the transistors are turned off. The monitoring voltage V is equal to the voltage of the module and the information transistor 17 and the power transistors are turned off.

If one of the switches closes, because of a pressure rises in one of the cells, the capacitor $C_1$ 9 is charged via the resistor $R_2$ 10 and the control transistor 14 is turned on. The capacitor 9 delays application to the gate of the transistor of a voltage which turns it on. Choosing the values of the capacitor $C_1$ and the resistor $R_2$ delays short circuiting of the module. This prevents the system responding to spurious signals. The function of the zener diode 8 is to protect the gate of the transistor by limiting the voltage applied to it.

Because the transistor is turned on, the capacitor $C_2$ 15 is charged; the information transistor 17 and the power transistors $12_1$ to $12_n$ are turned on. The module is short circuited and the fuse 3 therefore blows and isolates the cells.

Because the information transistor is turned on, the information voltage V is representative of the voltage supplied by the module.

The diode 6 memorizes the status of the system. As long as at least one of the switches remains closed, there is a voltage at the terminals of the resistor $R_1$ 7, and therefore at the terminals of the control transistor 14, and the control transistor and the power transistors therefore continue to conduct.

If the pressure in the cells drops again and the switch opens, the diode $D_1$ 6 maintains a voltage at the terminals of the resistor $R_1$ 7 equal to the difference between the voltage of the cells and the threshold voltage of the diode. Because of this voltage, the control transistor and the power transistors continue to conduct.

The diode therefore memorizes the malfunction, even if it is no longer present. This function is assured by connecting the diode to the terminals of the switches and to one terminal of the module on the side which is isolated from the cells by the fuse when it blows. The diode is therefore connected so that the control transistor continues to conduct even if the malfunction is no longer present.

In the circuits shown in FIGS. 1 and 2, the cathode of the diode is connected to the drain of the power transistors and the anode is connected to the gate of the control transistor via the resistor $R_2$. It is possible to connect the diode differently, in particular if the fuse is on the negative side of the cells instead of on the positive side, as shown in the figure. In this case, the anode of the diode is connected to the negative terminal of the module, on the same side as the fuse.

In either case, the diode ensures that the cell voltage is applied to the gate of the control transistor, regardless of the subsequent status of the sensor and the switches.

The invention therefore protects the cells without increasing the internal resistance of the module when it is operating normally; in normal operation, only the fuse is added to the power line, and the fuse has a low resistance compared to the resistance of the cells.

Furthermore, when the power transistors are turned on, they receive only the voltage of the cells that they isolate, and not the voltage of the battery as a whole; the invention therefore protects the power transistors, regardless of the number of modules constituting the battery, and therefore regardless of the battery voltage. Similarly, when the fuse blows it is subjected only to the voltage of the cells of the module; in both cases electrical arcing is prevented. The system can easily be adapted by choosing the rating of the fuse.

After isolating the cells, the module of the invention continues to conduct, with a resistance equal to the resistance of the power transistors. This resistance is low, especially in the case of N-type MOS transistors.

The components of the circuit of the invention are supplied with power by the cells. The invention therefore provides an autonomous solution independent of any external power supply.

FIG. 2 shows another embodiment of the invention. The embodiment of the invention shown in FIG. 2 uses switches which are closed when the cells are operating normally and which open in the event of a malfunction.

The circuit shown in FIG. 2 is identical to that shown in FIG. 1 except for the connection of the resistor $R_1$ and the switches $5_1$ to $5_6$. The switches $20_1$ to $20_6$ which are closed when the cells are operating normally, are connected in series. The series-connected combination of switches is connected to the terminals of the cells in series with a resistor $R_6$ 21. A resistor $R_5$ 22 is connected between the switches $20_1$ to $20_6$ and the resistor $R_6$, on the one hand, and the anode of the diode 6, on the other hand.

The remainder of the circuit (zener diode 8, capacitor $C_1$ 9, control transistor 14, capacitor $C_2$ 15, resistor $R_3$ 16, power transistors, transistor 18 and resistor $R_4$) is identical to the FIG. 1 circuit.

The resistors $R_5$ and $R_6$ can have the following values:

$R_5$ =10 kΩ

$R_6$ =100 kΩ

The circuit shown in FIG. 2 operates in the following manner. In normal operation the switches $20_1$ to $20_6$ are closed and there is no voltage at the terminals of the capacitor 9, as a result of which the control transistor 14, the power transistors and the information transistor 18 are turned off.

In the event of a malfunction, as soon as the pressure in a cell exceeds the safe value, the corresponding switch opens. The capacitor $C_1$ is charged via the resistors $R_6$, $R_5$ and $R_2$ and the control transistor 14 is turned on. As in the circuit shown in FIG. 1, the capacitor $C_1$ provides a time-delay before the module is short circuited.

Consequently, the capacitor $C_2$ is charged and the power transistors and the transistor 17 are turned on. The fuse and the cells are short circuited and the fuse blows to isolate the cells. As in the circuit shown in FIG. 1, the cells are isolated but the module continues to conduct via the power transistors.

Furthermore, even if the malfunction is no longer present and the switches are closed again, the voltage of the cells is applied to the capacitor $C_1$ and the gate of the control transistor via the power transistors, the diode 6 and the resistor $R_2$. As in the circuit shown in FIG. 1, a voltage equal to the voltage at the terminals of the cells continues to be applied to the capacitor and to the gate of the control transistor.

Thus the diode has the same memory function as in the circuit shown in FIG. 1.

The circuits shown in FIGS. 1 and 2 can easily be fabricated by the skilled person, for example using conventional components. The system can then be mounted in the cover of the cells.

In the examples shown in FIGS. 1 and 2, the switches are controlled by pressure sensors installed in one or more cells of the battery. The invention also applies to other types of sensor, for example temperature sensors or sensors responsive to the voltage at the terminals of the various cells.

In the case of voltage sensors, a comparator can be provided for comparing the voltage at the terminals of each cell with a set point value; the comparators are connected a logic unit for determining if at least one voltage is above the set point value. If so, a voltage is applied to the gate of the control transistor, as explained with reference to the figures. This embodiment of the invention monitors the voltages at the terminals of each cell.

This embodiment could equally be combined with the embodiment shown in either of the figures to detect malfunctions due not only to the pressure in the modules but also to the voltage at the terminals of the cells.

The invention applies in particular to electric vehicles and more particularly to Li-ion cells for secondary storage batteries intended for such vehicles. An Li-ion electrochemical pair and plane or spiral-wound electrodes, i.e. prism-shaped or cylindrical cells, are preferably used. The invention applies to protecting a module formed of six cylindrical cells, for example. In the embodiments of the invention described, and in particular in the application to electric vehicles, the module continues to conduct after the switches are closed or opened to turn on the power transistors and to blow the fuse. The diode provides a memory function and the module continues to conduct as soon as the sensors have detected a malfunction, regardless of the subsequent status of the cells.

Of course, the present invention is not limited to the examples and embodiments described and shown and lends itself to many variants that will be evident to the skilled person. Thyristors, IGBT or other components falling within the definition of "power transistor" could therefore be used instead of the power transistors shown in the figures. The description refers to the example of a fuse; a circuit-breaker or any other interrupter device could be used instead.

Furthermore, it is clear that the information part (transistor 17 and resistor 18) can be omitted from the circuit shown in FIGS. 1 and 2 without degrading the operation of the circuit. Likewise the zener diode, and the resistor 10 and the capacitor 9 if the time-delay function is not needed. The capacitor 15 could also be dispensed with.

What is claimed is:

1. A battery module including at least one cell, at least one sensor, an interrupter device connected in series with the at least one cell and an electronic switch including:

at least one power transistor for short circuiting the series-connected components and the interrupter device if the at least one sensor senses a malfunction, and a diode for assuring that the at least one power transistor maintains the series-connected circuit short circuited regardless of the subsequent status of the at least one sensor.

2. The module according to claim 1, wherein the electronic switch further includes a control transistor for turning on the at least one power transistor if the at least one sensor senses a malfunction and wherein the diode is adapted to apply the voltage of the at least one cell to the gate of the control transistor if the at least one power transistor is turned on.

3. The module according to claim 2, wherein the diode is connected to the gate of the control transistor and to the terminal of the module on the same side as the interrupter device.

4. The module according to claim 3, wherein the diode is connected to the gate of the control transistor via a resistor.

5. The module according to claim 2, having a capacitor for delaying application of a voltage to the gate of the control transistor.

6. The module according to claim 2, having a zener diode for limiting the voltage applied to the gate of the control transistor.

7. The module according to claim 1, wherein the at least one sensor includes a pressure-sensitive switch.

8. The module according to claim 1, wherein the at least one sensor includes a pressure-sensitive switch for each cell.

9. The module according to claim 1, wherein the at least one sensor includes an overvoltage sensor.

10. The module according to claim 1, wherein the at least one sensor includes a sensor responsive to overvoltages at the terminals of each cell.

11. The module according to claim 2, wherein the at least one sensor controls switches which are connected in parallel and are open when the at least one cell is operating normally, wherein the series-connected combination of a resistor and the switches shunts the terminals of the at least one cell, and wherein the gate of the control transistor is connected between said resistor and said at least one sensor.

12. The module according to claim 2, wherein the at least one sensor controls switches which are connected in series with a resistor and are closed when the at least one cell is operating normally, wherein the switches and the resistor shunt the terminals of the at least one cell, and wherein the gate of the control transistor is connected between said resistor and said at least one sensor.

13. Method of protecting against malfunctions a battery module including at least one cell connected in series with an interrupter device, at least one sensor and at least one power transistor controlled by said at least one sensor, in which method:

if the at least one sensor detects a malfunction it operates the at least one power transistor which closes the series-connected circuit made up of the at least one cell and the interrupter device, and a diode which keeps the at least one power transistor in the state closing the series-connected circuit regardless of the subsequent status of the at least one sensor.

14. The method according to claim 13, wherein the at least one sensor operates the at least one power transistor if the malfunction continues after a time-delay.

* * * * *